US006959733B2

(12) United States Patent
Sbongk

(10) Patent No.: US 6,959,733 B2
(45) Date of Patent: Nov. 1, 2005

(54) CLOSURE PLUG FOR SEALINGLY CLOSING A HOLE IN A STRUCTURAL MEMBER

(75) Inventor: Albert Sbongk, Niederstetten (DE)

(73) Assignee: ITW Automotive Products GmbH & Co. KG, Iserlohn (DE)

( * ) Notice: Subject to any disclaimer, the term of this patent is extended or adjusted under 35 U.S.C. 154(b) by 28 days.

(21) Appl. No.: 10/705,965

(22) Filed: Nov. 13, 2003

(65) Prior Publication Data

US 2005/0000973 A1 Jan. 6, 2005

(30) Foreign Application Priority Data

Nov. 15, 2002 (DE) ........................................ 102 53 983

(51) Int. Cl.[7] ................................................ F16L 55/10
(52) U.S. Cl. .......................................... 138/89; 138/92
(58) Field of Search .................... 138/89, 90; 220/787; 215/256

(56) References Cited

U.S. PATENT DOCUMENTS 4,885,121 A 12/1989 Patel .......................... 264/255
2004/0084099 A1 * 5/2004 Miura ........................ 138/89

FOREIGN PATENT DOCUMENTS

| | | | |
|---|---|---|---|
| DE | 69 33 117 | | 8/1969 |
| DE | 2 400 876 | | 7/1974 |
| DE | 3 512 582 | | 10/1986 |
| JP | 61-059067 | | 3/1986 |
| JP | 61-233270 | | 10/1986 |
| JP | 6280364 | * | 4/1987 |
| JP | 08-268451 | | 10/1996 |
| JP | 11-230348 | | 8/1999 |
| JP | 2001-124205 | * | 5/2001 |
| JP | 2004-156665 | * | 6/2004 |

* cited by examiner

*Primary Examiner*—Patrick Brinson
(74) *Attorney, Agent, or Firm*—Lowe Hauptman & Berner, LLP

(57) ABSTRACT

A plug for closing a hole in a structural member includes a shank having an upper end with a recess extending toward the lower end of the shank. The recess divides the upper end into a central portion and an outer, deformable portion radially outwardly spaced from the central portion by the recess. The deformable portion has an engagement region deformable by and sealingly engageable with a wall of the hole when the shank is pressed into and retained by the hole. The flange extends radially outwardly from the outer, deformable portion. The engagement region has an outer diameter larger than an inner diameter of the hole, whereby the material of the engagement region can be deformed into the recess when the shank is pressed into the hole and the wall of the hole forms a groove in the engagement region thereby retaining the shank in the hole.

20 Claims, 1 Drawing Sheet

CLOSURE PLUG FOR SEALINGLY CLOSING A HOLE IN A STRUCTURAL MEMBER

FIELD OF THE INVENTION

The invention relates to a closure plug for the sealingly and acoustically dampening closing of a hole in a structural member, preferably of sheet metal.

BACKGROUND OF THE INVENTION

The manufacturing of bodies of automobiles involves the making of a plurality of openings or holes which eventually have to be closed by closure plugs. The closure plugs must be of a design such that they provide for a sealing effect so that foreign matters and humidity cannot pass through the hole from one side of the metal sheet to the other side. Humidity enclosed within the car body may result in corrosion. Since such holes form also so-called acoustic bridges, the closure plugs are to be designed such as to provide for acoustic dampening.

A great number of various closure plugs have become known. The closure plugs generally comprise a skirt-like shaft and a flange which sealingly engages the adjacent surface of the structural member. The shaft has at its outer surface, below the flange a circumferentially continous or discontinous undercut defined by a shoulder which engages the opposite side of the structural member. In this manner the closure plug is securely retained within the hole. Furthermore, the distance between the shoulder and the flange is dimensioned such that the flange is deflected outwards and upwards when the shaft is inserted into the hole, thereby generating a corresponding force for urging the flange against the structural member. Furthermore, it has become known to design the closure plug in the area of the flange such that deflection of the flange at the same time generates a radial force for urging a shaft portion against the wall of the hole.

These closure plugs of the prior art have proven to be satisfactory as to their function. With respect to holes of sufficient diameters these closure plugs may be readily, also manually, inserted into the holes. If, however, the closure plugs are to be used for holes having a diameter of 10 mm or less, the closure plugs of the prior art can be assembled only under extremely high forces or possibly not at all.

SUMMARY OF THE INVENTION

It is a primary object of the invention to provide a closure plug for the sealingly and acoustically dampening closing of a hole in a structural member of metal sheet material, which closure plug may be readily and simply, in particular manually, assembled also in holes of small diameter and nevertheless provide for sufficient sealing and acoustic dampening.

The closure plug of the present invention comprises a skirt-like shaft having a sealing portion with a smooth conical outer surface in the area of the sealing engagement. Such a design differs significantly from conventional closure plugs having a shaft which, as mentioned above, is provided externally with an undercut. The diameter of the conical portion always exceeds the diameter of the hole.

Of course, it is possible to provide a cylindrical portion of a diameter which exceeds the diameter of the hole; a suitable shape of the shaft in the remaining area ensures that the cylindrical portion can be pressed into the hole without any substantial forces.

The increased diameter of the cylindrical or conical sealing portion requires the material to be able to yield within this area. This is why the invention provides, on the inner side of the connection between the flange and the shaft, a free space which forms an annular shaft portion below the flange. The free space extends preferably up to the level of the sealing engagement or somewhat beyond thereof. In other words, the free space terminates axially on the side of the structural member opposite to the flange or in spaced relationship to this side. Inserting the shaft into the hole causes the material of the annular shaft portion to be deformed into the free space, whereby a circumferential groove is formed in the annular portion with the assistance of the hole wall so as to form said undercut.

In the closure plug of the invention the sealing engagement within the hole is generated by overdimensioning the outer diameter of the annular portion of the shaft, whereby the shaft is radially pressed against the hole wall. A further sealing effect is obtained by the flange being pressed against the adjacent surface of the structural member.

The closure plug of the invention, while providing for excellent sealing, may be readily manually assembled and still is securely retained within the hole of the structural member due to the formed undercut. The structure of the closure plug of the invention and the use of a suitable material allow to provide also for sufficient acoustic dampening. The acoustic dampening effect may be improved by using plug members of predetermined thickness. The acoustic dampening and sealing effects will not be detrimentally affected even by drastic temperature changes, for example from 100° C. to −40° C. or from −40° C. to 100° C.

According to an aspect of the invention the material of the closure plug of the invention is a thermoplastic elastomeric material, preferably of high density. Furthermore, the thermoplastic elastomeric material is of a small pressure deformation remainder.

To facilitate insertion of the closure plug into the hole, a modification of the invention provides that the shank beneath the sealing portion has an entrance portion also including a conical outer surface, the diameter of the surface increasing towards the sealing portion and being smaller than the diameter of the hole.

To provide for optimal acoustic dampening, it is preferred to make the shaft of solid material. To this end an embodiment of the invention provides that the shank beneath the free space is annularly formed with a triangular cross-section of the annulus, one apex of the triangle facing towards the free end of the shank.

The length of the shaft may be relatively small, for example less than the maximal diameter of the shaft.

According to a further aspect of the invention, radially inwardly of the flange the shank is connected with a head portion, and the free space is formed by an annular recess of the head portion concentrically to the axis of the shank. Preferably, the head portion is punch-shaped with an upper surface extending upwardly beyond the flange.

Urging a finger against the upper side of the head provides for sufficient pressure to insert the closure plug into the hole. When the cross-section of the annular shaft, as already mentioned, is of triangular shape, the pressure exerted upon the punch-shaped head generates a downwardly inclined and radially outwards directed force which allows effectively to press the shaft into the hole so as to form the groove in the shaft below the flange wherein the hole wall is engaged.

According to a further aspect of the invention, the annular recess has a width and the flange is formed such that the flange upon insertion of the plug body into the hole is deformed by the structural member approximately in the plane of the associated surface and an annular inner surface of the flange engages the outer surface of the head portion in that the annular shank portion connected to the flange is pivoted radially inwardly relative to the remaining portion of the shank. When the closure plug is inserted as described, the material of the shaft is urged radially inwards and yields so as to be deformed inwards into the free space and downwards as well as upwards so as to form the above mentioned annular groove. At the same time the flange is deflected upwards; the point of gravity is disposed in the area of the lower terminal end of the annular portion of the shaft whereby the radially outer surface of the undercut inwardly limiting the flange is caused to engage the radially inner surface of the undercut so as to limit deflection thereof. This provides for sufficiently high pressing forces to urge the shaft against the wall of the hole and for sufficient forces to urge the flange against the adjacent surface of the structural member in order to develop a satisfactory sealing effect.

BRIEF DESCRIPTION OF THE DRAWINGS

For a full understanding of the nature and objects of the present invention reference should be made to the following detailed description of the invention which is to be read in conjunction with the associated drawings wherein.

DETAILED DESCRIPTION OF THE INVENTION

Figure 1:
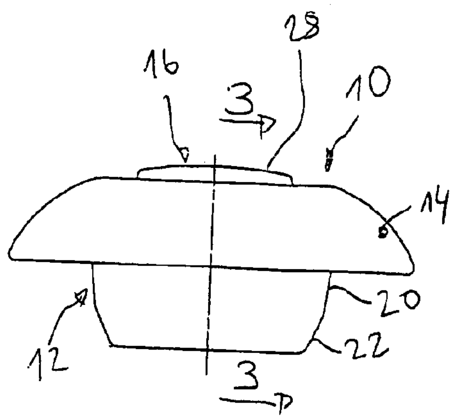
FIG. 1 is a side elevation of a closure plug of the invention.
Figure 2:
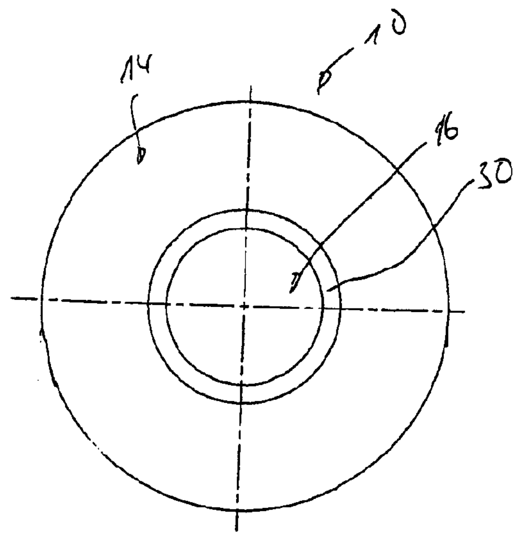
FIG. 2 is a top view of the closure plug in FIG. 1.
Figure 3:
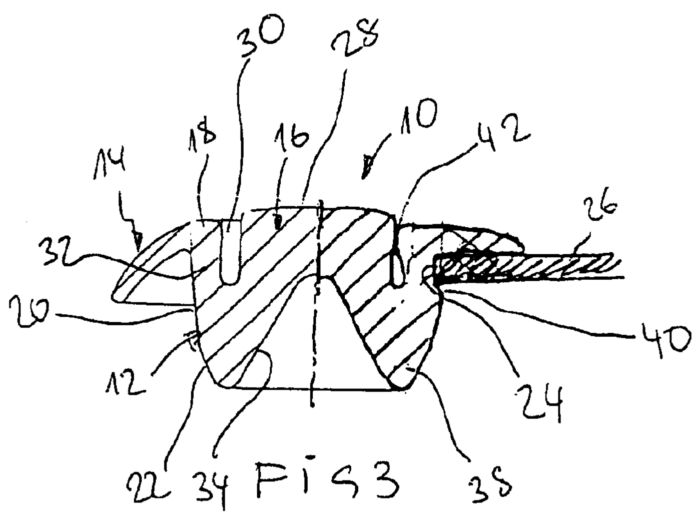
FIG. 3 is a cross-sectional view of the closure plug in FIG. 1 along the line 3—3, with the lefthand half of the plug being in its released condition and the righthand half of the closure plug being in its assembled condition.

As shown in FIGS. 1 to 3, a closure plug member 10 comprises a skirt-like shaft 12, an annular flange 14, and a head 16. These parts are integrally formed of a thermoplastic elastomeric material of high density and low pressure deformation remainder.

As shown in FIGS. 1 and 3, the radial flange 14 when in its released condition has, towards head 16, an upper surface of slightly convex arcuate shape and a lower surface of slightly concave arcuate shape. The shaft 12 is integral therewith at the radially inner side of the annular or radial flange 14 at 18 and extends downwardly. An outer surface portion 20 of the shaft 12, which extends downwards from the underside of the connecting portion 18, is of conical shape and of a gradually downwardly decreasing diameter. This surface portion 20 merges into a further conical surface portion 22 which is also of a downwardly decreasing outer diameter. The surface portions 20, 22 are smooth, and the diameter of the surface portion 22 everywhere is smaller than the diameter of a hole 24 in a sheet metal 26. The diameter of the surface portion 20 exceeds the diameter of the hole 24 at least in the upper area adjacent the flange 14.

The head 16 is punch-shaped and has a slightly convex upper surface 28 disposed above the upper surface of the radial flange 14. An annular undercut 30 is formed between the punch-shaped head 16 and the connection portion 18 of the radial flange 14. The annular undercut 30 extends for a certain axial length towards the underside of the shaft 12, preferably slightly beyond the underside of the metal sheet 26, when the closure plug member 10 has been inserted into the hole 14. The undercut 30 defines an annular sealing portion 32 of the shaft 12. Below the undercut 30 the shaft 12 comprises an annular solid portion of an approximately triangular cross-section, with the tip of the triangle being directed downwards. This geometrical shape results from a conical depression 34 being formed within the underside of the closure plug member 10. Altogether, the annular portion 32, the head 16, and the annular part of the shaft 12 below the undercut 30 each are of relatively substantial thickness.

The closure plug member 10 as shown is particularly suited for holes of small diameter, preferably below 10 mm. When it has been inserted into the hole 14, an insertion portion 38 disposed in the area of the conical surface portion 22 is intended to assist in "finding" the hole. Thereafter, a finger or thumb is used to exert a pressing force upon the arcuate surface 28. As a result thereof, the shaft 20 is pressed into the hole 24 which is of small diameter, while the respective portions of the shaft are deformed. In the area of the undercut 30 the material yields to be deformed into the undercut so as to form a shoulder 40 which ensures secure retention thereof within the hole 24. The annular portion 32 generates in this area a pressure directed radially outwards to provide in cooperation with the wall of the hole 24 for a sealing action. The radial flange 14 is deflected upwards into the plane of the upper surface of the metal sheet 26 as may be seen in FIG. 3. The annular portion 32 may be slightly deflected inwards at the level of the lower terminal end of the undercut 30. This causes the connection portion 18 between the flange 14 and the annular portion 32 to engage the outer surface of the head 16 as shown at 42. This engagement at 42 resists any further deformation of the flange 14 whereby the pressing forces exerted upon the hole wall and the upper side of the metal sheet 26 will be of a predetermined value. Nevertheless, the closure plug member as shown may be pressed into the hole 24 manually without any further means.

The closure plug member 10 provides for fluidtight sealing within the hole 24. Furthermore, the closure plug member, due to its solid or massive design, provides for sufficient acoustic dampening.

What is claimed is:

1. A plug for closing a hole in a flat structural member in a sealing and acoustically dampening manner, said plug comprising:

a shank which is adapted to be sealingly inserted into the hole and retained in the hole by an undercut cooperating with a wall of the hole; and a radial flange integrally formed at one end of the shank of resilient material, the flange having a radially outwardly oblique or bent portion which is adapted to sealingly engage an associated surface of the structural member upon deformation when the shank is inserted into the hole;

wherein the shank, in an area of sealing engagement with the hole, has a sealing portion which, in a non-biased state, has a smooth conical outer surface, the outer surface having a diameter which increases towards the flange at least in the area of sealing engagement and is larger than that of the hole;

a free space is provided on an inner side of a juncture of the flange and the shank, said free space extending axially towards the other end of the shank up to or beyond the area of sealing engagement, whereby an annular shank portion is formed beneath the flange, and, when the shank is pressed into the hole, a material of the annular shank portion is deformable into the free space and the wall of the hole causes an annular groove in the annular shank portion, the groove defining the undercut;

radially inwardly of the flange the shank is connected with a bead portion, and the free space is formed by an annular recess of the head portion; and the head portion has an upper surface extending upwardly beyond the flange.

2. The plug of claim 1, wherein an entirety of the plug is integrally formed of a thermoplastic elastomer.

3. The plug of claim 1, wherein the annular recess of the head portion is concentric to an axis of the shank and head portion is punch-shaped.

4. The plug of claim 3, wherein the upper surface of the punch-shaped head portion is convex.

5. The plug of claim 3, wherein the annular recess has a width and the flange is formed such that, upon insertion of the plug into the hole, the flange is deformed by the structural member approximately in a plane of the associated surface and an annular inner surface of the flange engages an outer surface of the head portion in that the annular shank portion connected to the flange is pivoted radially inwardly relative to a remaining portion of the shank.

6. A plug for closing a hole in a structural member, said plug comprising:

a shank comprising an upper end and a lower end, the upper end having a recess extending downwardly toward the lower end, said recess dividing the upper end into a central portion and an outer, deformable portion radially outwardly spaced from said central portion by said recess, said outer, deformable portion having an engagement region adapted to be deformed by and sealingly engage a wall of the hole when the shank is pressed into and retained by the hole; and a flange extending radially outwardly from said outer, deformable portion and being adapted to sealingly engage an upper surface of the structural member when the shank is pressed into and retained by the hole;

wherein said shank has an outer surface which is partially defined by an outer surface of said outer, deformable portion, the outer surface of said shank having a diameter that is greater in said engagement region than in any other region of said shank below said engagement region, the diameter of the outer surface of said shank in the engagement region being adapted to be greater than an inner diameter of the hole, whereby said engagement region is deformed by the wall of the hole when the shank is pressed into and retained by the hole.

7. The plug of claim 6, wherein an entirety of the plug is integrally formed of a thermoplastic elastomer.

8. The plug of claim 6, wherein said shank tapers from said engagement region to the lower end thereof.

9. The plug of claim 6, wherein said shank, below said recess, has a shape of an annulus having a substantially triangular cross section.

10. The plug of claim 6, wherein the central portion has an upper surface extending upwardly beyond the flange.

11. The plug of claim 10, wherein the recess is concentric to an axis of said shank, the central portion is punch-shaped and the upper surface of the punch-shaped central portion is convex.

12. The plug of claim 6, wherein the outer surface of said engagement region is cylindrical.

13. The plug of claim 6, wherein the diameter of the outer surface of said shank decreases all the way from said engagement region to a lowermost point of said shank.

14. A plug for closing a hole in a structural member, said plug comprising:

a shank comprising an upper end and a lower end, the upper end having a recess extending downwardly toward the lower end, said recess dividing the upper end into a central portion and an outer, deformable portion radially outwardly spaced from said central portion by said recess, said outer, deformable portion having an engagement region adapted to be deformed by and sealingly engage a wall of the hole when the shank is pressed into and retained by the hole; and a flange extending radially outwardly from said outer, deformable portion and having a lower surface adapted to sealingly engage an upper surface of the structural member when the shank is pressed into and retained by the hole;

wherein an outer surface of said outer, deformable portion has a diameter decreasing from a point, where the lower surface of said flange meets said outer, deformable portion, to a level of a bottom of said recess.

15. The plug of claim 14, wherein the outer surface of said outer, deformable portion is conical.

16. The plug of claim 14, wherein said shank has an outer surface that is partially defined by the outer surface of said outer, deformable portion;

the outer surface of said shank having a diameter decreasing from the point, where the lower surface of said flange meets said outer, deformable portion, to a lowermost point of said shank.

17. The plug of claim 16, wherein the outer surface of said shank comprises multiple conical sections arranged consecutively in an axial direction of said shank, conical angles of said conical sections increasing towards the lowermost point of said shank.

18. The plug of claim 14, wherein an entirety of the plug is integrally formed into a single body.

19. The plug of claim 18, wherein the central portion has an upper surface extending upwardly beyond the flange.

20. The plug of claim 19, wherein the recess is concentric to an axis of said shank, the central portion is punch-shaped, and the upper surface of the punch-shaped central portion is convex.

* * * * *